(12) United States Patent
Mandrou et al.

(10) Patent No.: US 7,854,264 B2
(45) Date of Patent: Dec. 21, 2010

(54) VOLUMETRIC COMPENSATING ANNULAR BELLOWS

(75) Inventors: Laure Mandrou, Pearland, TX (US); Alain Dorel, Houston, TX (US); Kevin Hayes, Missouri City, TX (US); Reinhard Powell, Pearland, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 276 days.

(21) Appl. No.: 11/945,750

(22) Filed: Nov. 27, 2007

(65) Prior Publication Data

US 2009/0133880 A1 May 28, 2009

(51) Int. Cl.
*E21B 7/12* (2006.01)
*E21B 23/00* (2006.01)

(52) U.S. Cl. .................. 166/344; 166/346; 166/387; 166/212

(58) Field of Classification Search ............ 166/346, 166/344, 382, 378, 387, 338, 134, 138
See application file for complete search history.

(56) References Cited

U.S. PATENT DOCUMENTS

| | | | | |
|---|---|---|---|---|
| 2,688,928 A * | 9/1954 | Vincent et al. ............... 92/43 |
| 3,050,121 A * | 8/1962 | Garrett et al. ............... 166/285 |
| 3,105,509 A * | 10/1963 | Moore, Jr. ................ 137/102 |
| 3,455,157 A * | 7/1969 | Lahaye et al. ............. 73/152.55 |
| 3,477,507 A * | 11/1969 | Page, Jr. .................. 166/322 |
| 3,940,980 A * | 3/1976 | Tasker et al. ............. 73/152.51 |
| 4,181,014 A * | 1/1980 | Zuvela et al. ............ 340/853.5 |
| 4,265,305 A * | 5/1981 | Stone et al. ................ 166/113 |
| 4,278,942 A * | 7/1981 | Bonnet et al. ............... 324/347 |
| 4,329,127 A * | 5/1982 | Tschirky et al. ............. 418/48 |
| 4,332,401 A | 6/1982 | Stephenson et al. |
| 4,453,892 A * | 6/1984 | Brookbank, III ............ 417/279 |
| 4,454,756 A * | 6/1984 | Sharp et al. .............. 73/152.54 |
| 4,467,870 A * | 8/1984 | Langham .................... 166/321 |
| 4,548,273 A * | 10/1985 | Leicht et al. ................ 166/348 |
| 4,564,068 A * | 1/1986 | Baugh ........................ 166/123 |
| 4,573,537 A * | 3/1986 | Hirasuna et al. ............ 166/387 |
| 5,056,599 A * | 10/1991 | Comeaux et al. ............ 166/310 |
| 5,143,158 A | 9/1992 | Watkins et al. |
| 5,421,241 A | 6/1995 | Terral |
| 5,601,316 A | 2/1997 | Totino et al. |
| 6,182,755 B1 | 2/2001 | Mansure |
| 6,484,801 B2 * | 11/2002 | Brewer et al. .............. 166/65.1 |
| 6,695,067 B2 * | 2/2004 | Johnson et al. ............. 166/387 |
| 6,932,581 B2 | 8/2005 | Messick |
| 7,180,826 B2 | 2/2007 | Kusko et al. |
| 7,216,737 B2 | 5/2007 | Sugiyama |
| 7,217,107 B2 | 5/2007 | Du et al. |
| 7,246,668 B2 | 7/2007 | Smith |
| 7,369,716 B2 * | 5/2008 | Berg et al. ..................... 385/12 |
| 7,647,980 B2 * | 1/2010 | Corre et al. ................ 166/387 |

(Continued)

*Primary Examiner*—Thomas A Beach
(74) *Attorney, Agent, or Firm*—Brandon S. Clark; Rodney V. Warfford; Kevin B. McGoff

(57) ABSTRACT

Embodiments of the present invention relate to a volumetric compensating annular bellows used to compensate two fluid volumes by an annular displacement. This is achieved using a bellows welded on to a tube with a varying shape radius. A bellows is arranged within the annulus and is deformable in an annular direction in response to fluid volume expansion. The bellows can be used in several oilfield applications for fluid compensation.

20 Claims, 3 Drawing Sheets

U.S. PATENT DOCUMENTS

| | | | |
|---|---|---|---|
| 7,654,315 B2 * | 2/2010 | Du et al. | 166/105 |
| 7,743,825 B2 * | 6/2010 | O'Malley et al. | 166/179 |
| 2007/0074872 A1 * | 4/2007 | Du et al. | 166/369 |
| 2007/0142547 A1 | 6/2007 | Vaidya et al. | |
| 2007/0289779 A1 | 12/2007 | Howard et al. | |
| 2009/0133880 A1 * | 5/2009 | Mandrou et al. | 166/335 |

* cited by examiner

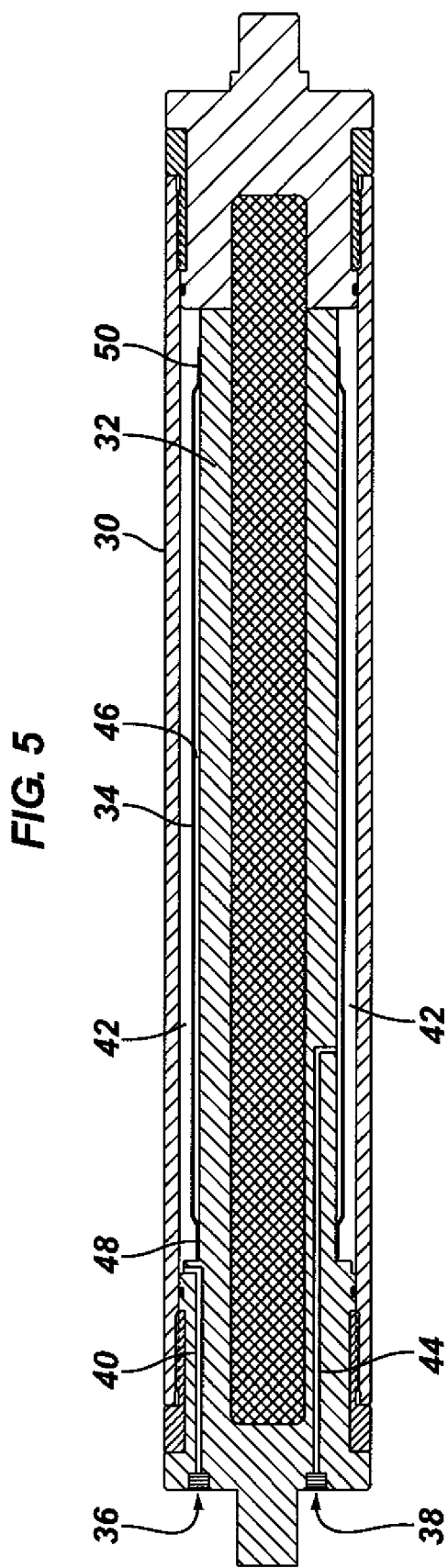

VOLUMETRIC COMPENSATING ANNULAR BELLOWS

FIELD OF THE INVENTION

The present application relates generally to enhancements in wellhead assemblies, and in particular to an apparatus and methods for pressure compensation in tools.

BACKGROUND

Oilfield production equipment often requires pressure compensation to compensate fluid volumes within the system. There are many ways to compensate two fluid volumes, including but not limited to compensating pistons and axial bellows. Compensating pistons and axial bellows work well for fluid volumes that are offset axially but are not suitable to compensate fluid volumes that are concentric. Current technologies often require the use of a sealing element which may not be reliable in permanent oilfield downhole equipment.

Bellows have been used in motor protectors. U.S. Pat. No. 7,217,107 illustrates a motor protector comprising a bellow assembly for isolating the internal fluid of a submersible pumping system. Bellows have been used for expansion joints to compensate for thermally induced forces. U.S. Pat. No. 4,332,401 illustrates an expansion joint for casing used in injecting steam into wells. U.S. Pat. No. 5,421,241 and U.S. Pat. No. 6,932,581 both illustrate the use of bellows in gas lift valve systems. U.S. Pat. No. 5,143,158 illustrates the use of bellows in a subsea wellhead apparatus.

SUMMARY OF THE INVENTION

In accordance with various embodiments of the present invention, a downhole pressure compensation system comprises a mandrel disposed within a housing having an annular region therethrough. The system has injection ports mounted on the mandrel that are in communication with the annular region between the housing and the mandrel. A bellow is arranged within the annulus and is deformable in an annular direction in response to fluid volume expansions. The bellow is made up of a hollow cylindrical tube that is axially arranged in a generally tubular shape made up of a elastically deformable alloy that has welded ends.

The bellows has an oscillating radius. For example, the cross-sectional profile could have one of an angled, squared, or sinusoidal shape. The tube radially expands and contracts.

Also, embodiments of the invention provide a method for compensating fluids by annular displacement with the bellow providing a reliable barrier between two fluid volumes.

BRIEF DESCRIPTION OF THE DRAWINGS

FIG. 5 shows a schematic illustration of a sectional view of an annular compensating device incorporated in a system.

DETAILED DESCRIPTION

In the following description, numerous details are set forth to provide an understanding of the present invention. However, it is to be understood by those skilled in the art that the present invention may be practiced without these details and that numerous variations or modifications from the described embodiments may be possible.

In the specification and appended claims: the terms "connect", "connection", "connected", "in connection with", and "connecting" are used to mean "in direct connection with" or "in connection with via another element"; and the term "set" is used to mean "one element" or "more than one element". As used herein, the terms "up" and "down", "upper" and "lower", "upwardly" and downwardly", "upstream" and "downstream"; "above" and "below"; and other like terms indicating relative positions above or below a given point or element are used in this description to more clearly describe some embodiments of the invention. Moreover, the term "sealing mechanism" includes: packers, bridge plugs, downhole valves, sliding sleeves, baffle-plug combinations, seals, and all other methods and devices for temporarily blocking the flow of fluids through the wellbore.

Figure 1:
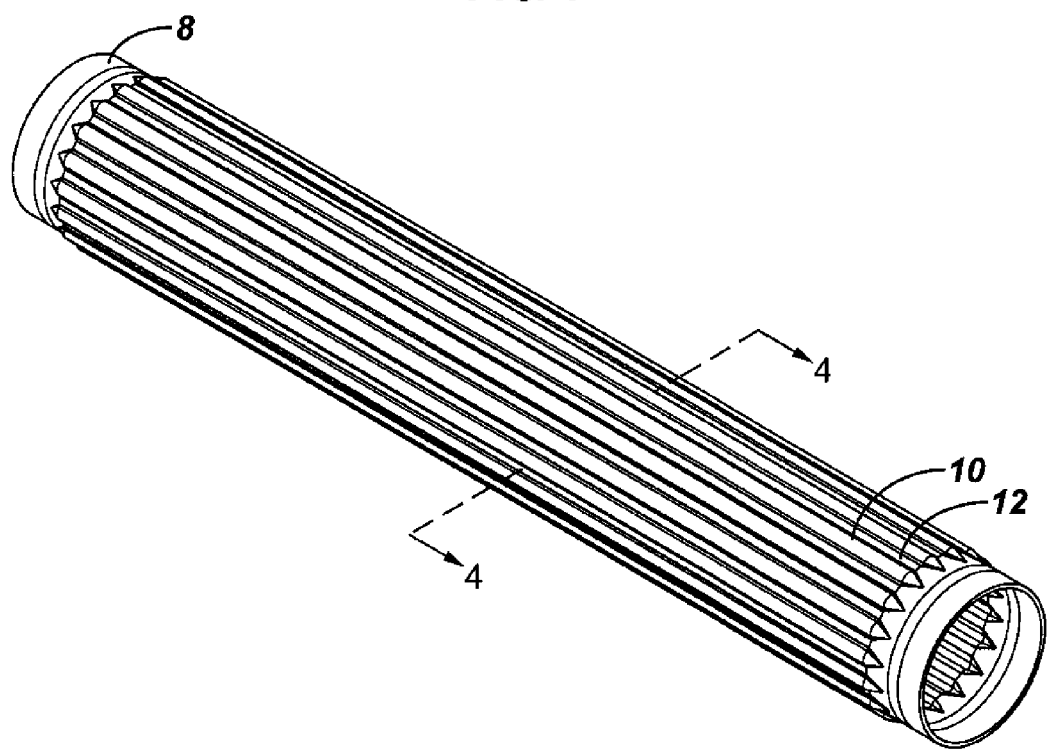
FIG. 1 illustrates an isometric view of an annular compensating device according to embodiments of the present invention.

Embodiments of the present invention provide a downhole system and method that include a pressure compensating device to compensate fluid volumes within the system. With reference now to the figures, and in particular to FIG. 1, an annular compensating device, known as bellows, is made up of a hollow tube (8) that is shown to include radii (10, 12) that deflect inwardly and outwardly in an annular direction in response to changes in fluid volume expansion caused by physical parameter (e.g. pressure or temperature). The tube (8) provides desired flexibility to allow the radii (10, 12) to be deflected inwardly and outwardly and allows the bellow to compensate two concentric fluid (liquid and/or gas) volumes that are on the inside and outside of the bellows. The radii (10-12) oscillate around the circumference, and FIG. 1 displays a wave shape which allows the bellows to expand or contract elastically along the longitudinal axis of the tube (8) by means of displacement in the annular direction. FIG. 1 demonstrates one possible embodiment of the annular device. The circumference of FIG. 1 could have several variations of oscillating radii. The radii (10, 12) oscillations could include, but are not limited to, an angle shape, square shape, rectangular shape or sinusoidal shape. The annular device is a flexible, expansible vessel and maybe constructed of a material having elastic properties, such as nickel, titanium and alloys thereof. The use of materials such as nickel-titanium alloy (NiTi) provide elastic and shape memory properties which are different than conventional metal alloys. The annular device made up of a elastic alloy will deform until it produces a maximum strain since any deformation beyond the maximum strain results in a permanent deformation. The elastic alloy will sense a change in ambient temperature and is able to convert its shape. The elasticity property of the annular compensating device allows the bellows to return to its original shape after a substantial deformation.

Figure 2:
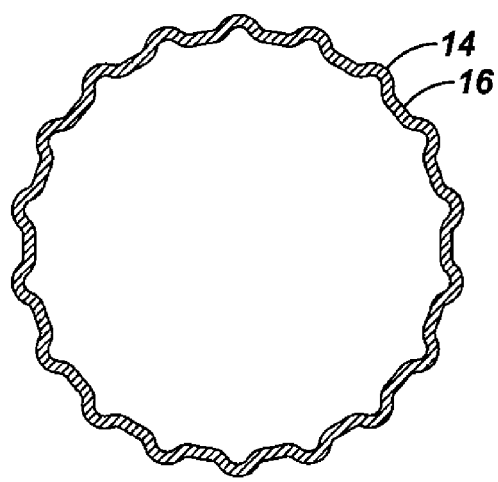
FIGS. 2, 3, and 4 illustrate a sectional profile of the annular compensating device of an embodiment of the present invention, taken along line 4-4 of FIG. 1.

The cross-sectional profile of FIG. 2 along line 4-4 in FIG. 1 displays a circumference with oscillating waves (14, 16). The profile illustrates a tube with the largest radius (14) and the smallest radius (16) that is in a wave shape or a sinusoidal shape. The present invention could have several variations in the wave shape and the number of waves around the circumference.

Figure 3:
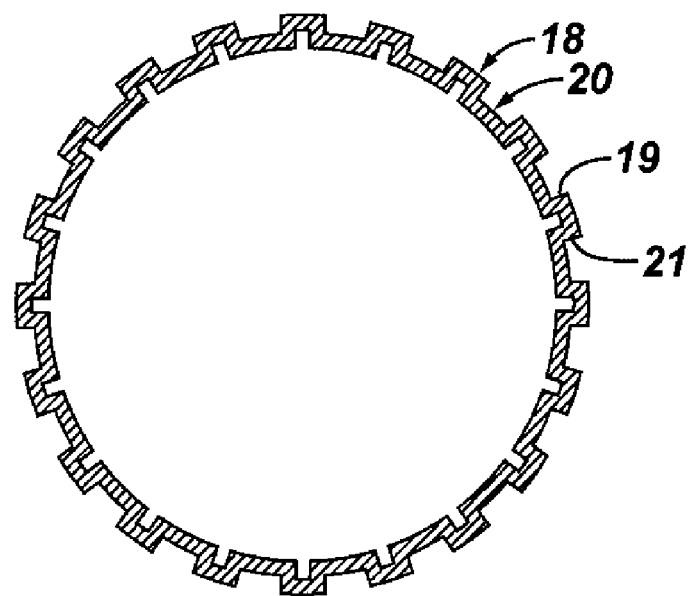

In one embodiment, the cross-sectional profile of FIG. 3 along line 4-4 in FIG. 1 displays a circumference with a varying square or a varying rectangular shaped circumference (18, 20). The profile illustrates a tube with the large radius (18) and the small radius (20) that has perpendicular sides (19-21). The present invention could have several variations in the square or rectangular shape and the number of sides (19, 21) around the circumference.

Figure 4:
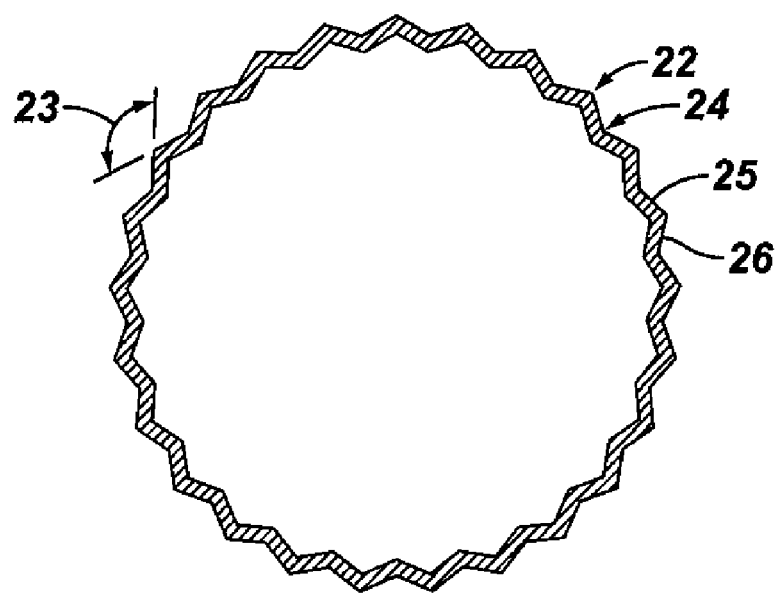

In another embodiment, the cross-sectional profile of FIG. 4 along line 4-4 in FIG. 1 displays a circumference with varying angles (23). The profile illustrates a tube with the large radius (22) and the small radius (24) that are made up of sides (25, 26) in an angular shape. The embodiments could have several variations in the angular shape and the number of angles (23) and sides (25, 26) around the circumference.

FIG. 5 displays one configuration of a bellows (34) that compensates two concentric fluid volumes that are on the inside and outside of the bellows (34). The two fluid volumes can be a liquid and gas, two liquid volumes or two gas volumes. The bellows (34) elastically deforms in the annular direction in response to fluid volume expansions caused by downhole conditions (eg. temperature and/or pressure). With reference to FIG. 5, a housing (30) and mandrel (32) enclose an annular region (42). Two injection ports (36, 38) are mounted on to the mandrel (32) that has control lines (40, 44) that communicate with the annular region (42). A bellows (34) is welded to the outer mandrel (32). A fluid (for example, oil) is injected from the port (38) through the control line (44) and into the inside of the bellows while a second fluid (for example, nitrogen) is injected from the port (36) through the control line (40) to the outside of the bellows (42). The bellows (34) allows the annular region (42) to be hydraulically connected to the annular pressure $P_A$ and to the internal pressure $P_I$, without being in fluid communication with either. For example, the control line (40) couples the bellows annulus (42) to the annular pressure $P_A$, and the internal control line (44) is coupled to the internal pressure $P_I$ (46). The bellows annular region (42) may be selectively coupled to either the annular pressure $P_A$ or the internal pressure $P_I$ by operation of the system. The bellows (34) compensate fluid volumes that are inside (46) and outside (42) the bellows (34) and provide a reliable barrier between the volumes. During temperature increases, both volumes may expand. The bellows (34) will accommodate the volumetric expansion differential by deforming elastically in the annular direction of the bellows (34) such that there is no differential pressure between the two volumes. Since oil is substantially incompressible, the bellows (34) may also expand from an alternate mating part trying to compress the oil volume, such as a piston. The ends of the bellow (48, 50) are welded so no seals are required in the system.

The bellows (34) could be used in several downhole oilfield applications including but not limiting to equipment such as flow control valves, artificial lift equipment, subsea equipment as well as drilling or wireline equipment. In completion applications, the bellows (34) can be used in equipment such that reservoir production and injection oil, gas or other fluids flow on the inside of the bellows in the axial direction. The bellows can also be welded to completion tubing such that reservoir production and injection oil, gas or other fluids come into contact with the tubing but not the bellows.

While the invention has been disclosed with respect to a limited number of embodiments, those skilled in the art will appreciate numerous modifications and variations there from. It is intended that the appended claims cover all such modifications and variations as fall within the true spirit and scope of the invention.

What is claimed is:

1. A downhole system comprising:
    an elongated mandrel disposed within a housing having an annular region therebetween;
    a first port and a second port mounted onto the mandrel and fluidly connected to the annular region; and
    a bellows disposed within the annular region, the bellows being configured to deform in a radial direction in response to fluid volume expansions within the annular region,
    wherein the ends of the bellows are welded to the mandrel, and wherein the bellows is not axially expandable.

2. The downhole system of claim 1, wherein the mandrel or the housing is connected to at least one equipment selected from the group consisting of flow control valves, artificial lift equipment, subsea equipment, drilling equipment, and wireline equipment.

3. The downhole system of claim 1, wherein the bellows separates the annular region into two separate axial flow paths between the mandrel and the housing.

4. The downhole system of claim 1, wherein the bellows has elastically deformable properties.

5. The downhole system of claim 1, wherein the bellows is configured to radially expand and contract.

6. The downhole system of claim 3, wherein the bellows provides a barrier between the two separate axial flow paths between the mandrel and the housing.

7. The downhole system of claim 1, wherein the ends of the bellows do not require seals.

8. The downhole system of claim 3, wherein the volume of at least one of the two separate flow paths between the mandrel and the housing is variable.

9. The downhole system of claim 1, wherein the bellows has a cross-sectional profile that is angled, squared, rectangular, or sinusoidal.

10. The downhole system of claim 1, wherein the bellows is made of material selected from the group consisting of: nickel, titanium, and alloys thereof.

11. The downhole system of claim 3, wherein separate flow paths contain either oil or gas.

12. A downhole system comprising:
    a mandrel disposed within a housing having an annular region therebetween;
    a first port and a second port mounted onto the mandrel and fluidly connected to the annular region; and
    a bellows disposed within the annular region, the bellows being configured to deform in a radial direction in response to fluid volume expansions within the annular region,
    wherein the ends of the bellows are welded to the mandrel, and wherein the bellows is not axially expandable.

13. The downhole system of claim 12, wherein the mandrel or the housing is connected to at least one equipment selected from the group consisting of flow control valves, artificial lift equipment, subsea equipment, drilling equipment, and wireline equipment.

14. The downhole system of claim 12, wherein the bellows separates the annular region into two separate axial flow paths between the mandrel and the housing.

15. The downhole system of claim 14, wherein the bellows provides a barrier between the two separate axial flow paths between the mandrel and the housing.

16. The downhole system of claim 14, wherein the volume of at least one of the two separate flow paths between the mandrel and the housing is variable.

17. The downhole system of claim 12, wherein the bellows is configured to radially expand and contract.

18. A downhole system comprising:
    a mandrel disposed within a housing having an annular region therebetween;
    a first port and a second port mounted onto the mandrel and fluidly connected to the annular region; and a bellows disposed within the annular region, the bellows being configured to deform in a radial direction in response to fluid volume expansions within the annular region, wherein the ends of the bellows are welded to the mandrel, the bellows is not axially expandable, and the bellows include one or more axially aligned folds that deflect inwardly and outwardly in the radial direction.

19. The downhole system of claim 18, wherein the one or more axially aligned folds each have a first end and a second end, and wherein the first end of one of the axially aligned folds is attached to a first end of the bellows and the second end of the same axially aligned fold is attached to a second end of the bellows.

20. The downhole system of claim 19, wherein the one or more axially aligned folds comprise a first fold and a second fold, wherein the first fold is proximate the second fold, and wherein the first fold has a greater radial distance from the axis of the mandrel than the second fold.

\* \* \* \* \*